Figure 1:
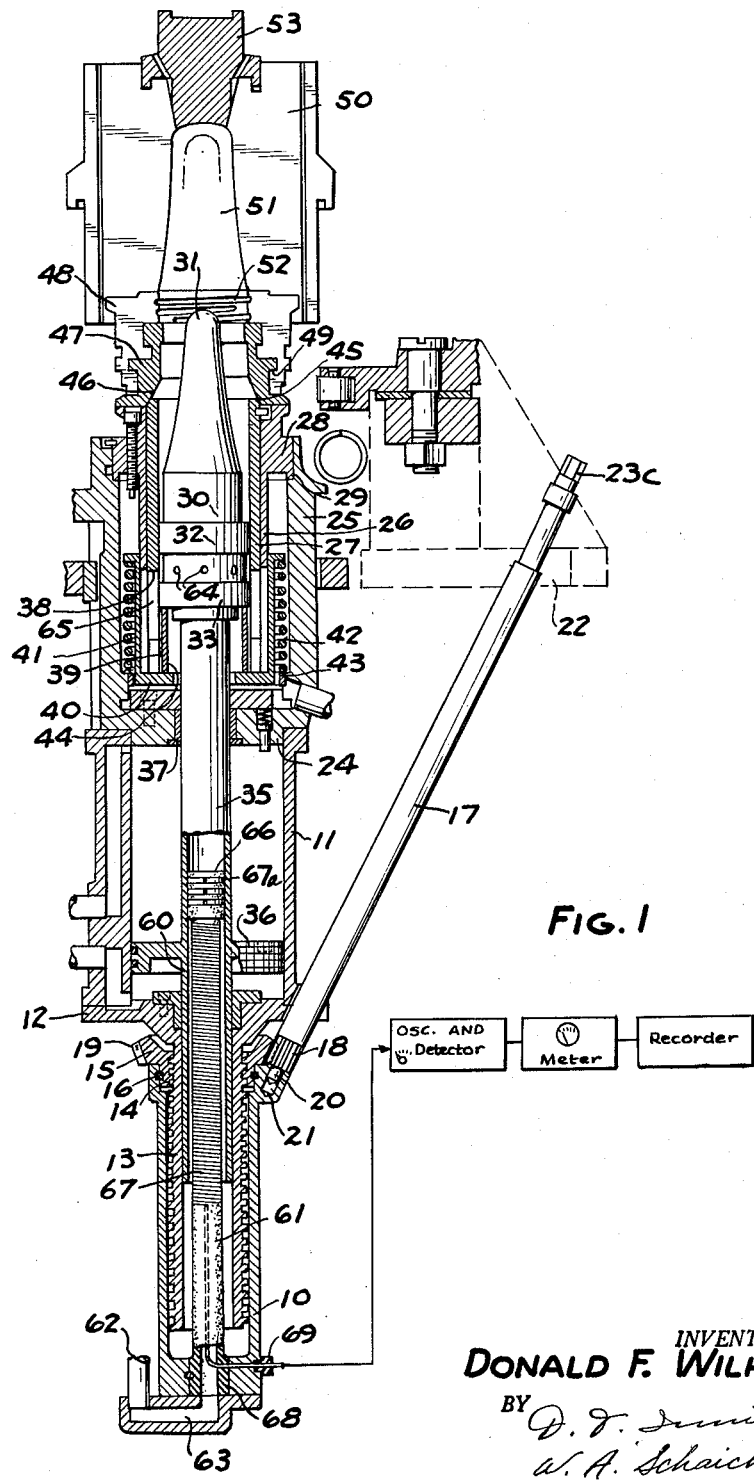

April 27, 1965  D. F. WILHELM  3,180,718
APPARATUS FOR ANALYZING MOVEMENT OF GLASS FORMING PLUNGERS
Filed July 3, 1961  3 Sheets-Sheet 1

INVENTOR.
DONALD F. WILHELM
BY
ATTORNEYS

April 27, 1965  D. F. WILHELM  3,180,718
APPARATUS FOR ANALYZING MOVEMENT OF GLASS FORMING PLUNGERS
Filed July 3, 1961  3 Sheets-Sheet 2

INVENTOR.
DONALD F. WILHELM
BY
ATTORNEYS

INVENTOR.
DONALD F. WILHELM
ATTORNEYS

United States Patent Office 3,180,718
Patented Apr. 27, 1965

3,180,718
APPARATUS FOR ANALYZING MOVEMENT OF GLASS FORMING PLUNGERS
Donald F. Wilhelm, Toledo, Ohio, assignor to Owens-Illinois Glass Company, a corporation of Ohio
Filed July 3, 1961, Ser. No. 121,402
3 Claims. (Cl. 65—158)

This invention relates to glass forming and particularly to analyzing the movement of glass forming plungers.

In one method of forming glass, a plunger is utilized to press a gob of molten glass into a predetermined shape. The resultant shaped glass or parison may thereafter be further shaped by blowing and the like to form articles such as glass containers. Alternatively, the formed article is in the desired shape by pressing alone. It has heretofore been suggested that the movement of the plunger and the degree of penetration of the plunger indicate the nature of the resultant article. Thus, if the plunger penetrates the gob of glass a greater distance or a lesser distance between successive cycles, then there is evidence that the gob size is varying. If the plunger movement and penetration can be measured, then the variables which control the gob size can be controlled in response to the measurement in order to produce more uniform results.

It is therefore an object of this invention to provide a method and apparatus for analyzing the movement and degree of penetration of a glass forming plunger.

It is a further object of the invention to provide such a method and apparatus which will operate efficiently and quickly without any mechanical contact of switches and the like.

It is a further object of the invention to provide such a method and apparatus wherein the movement of the plunger may be analyzed without interfering with the operation of the glass forming apparatus.

It is a further object to provide such a method and apparatus which are not adversely affected by variations in temperature encountered in the vicinity of the glass forming apparatus.

It is a further object of the invention to provide such a method and apparatus that can be used in connection with a cooled glass forming plunger with a minimum change in the structure of the glass forming apparatus.

Basically, the method and apparatus comprises utilizing a coil in association with a hollow metallic piston rod that conventionally forms part of the cylinder for moving the plunger into and out of the mold. The plunger is fixed on the piston rod. The coil is wound on a non-metallic air inlet tube that projects into the hollow piston rod to supply air to cool the plunger. The coil is connected in a resonant circuit so that as the metallic rod moves in association with the plunger, the inductance of the coil is changed. Apparatus is provided for measuring the change in inductance and providing a variable signal which is proportional to the movement of the plunger. In another form, apparatus is provided for detecting the change in frequency of the circuit due to movement of the metallic rod and providing a variable signal. In another form, a differential transformer is provided on the inlet tube and a circuit is associated with the transformer to detect variations in the output thereof due to movement of the metallic piston rod and provide a variable signal.

In order to compensate for temperature variations in the vicinity of the machine that might affect the signal, means are provided for producing a compensating signal that modifies the signal produced as the temperature varies in the area of the coil. Such temperature compensating means comprises a non-inductively wound coil positioned adjacent the first-mentioned coil or, alternatively, a thermocouple. Each of the temperature compensating devices are connected by circuits hereinafter described in order to produce a compensating signal.

Figure 2:
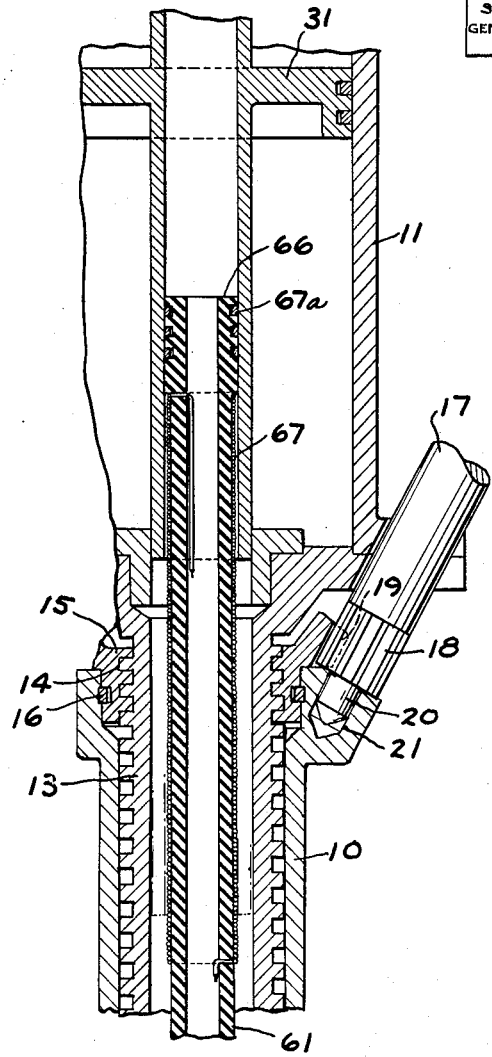
Figure 3:
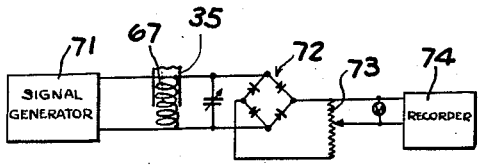
Figure 3A:
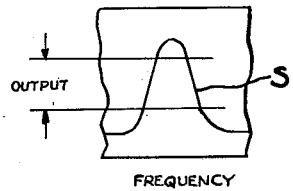
Figure 4:
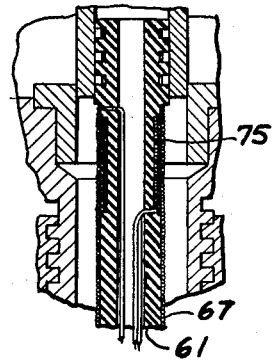
Figure 5:
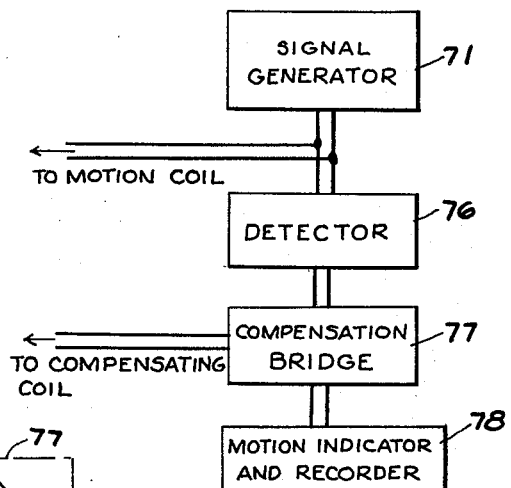
Figure 6:
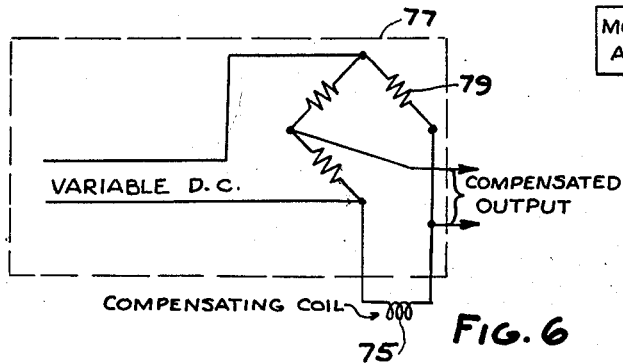
Figure 7:
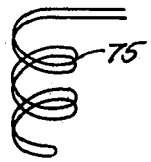
Figure 8:
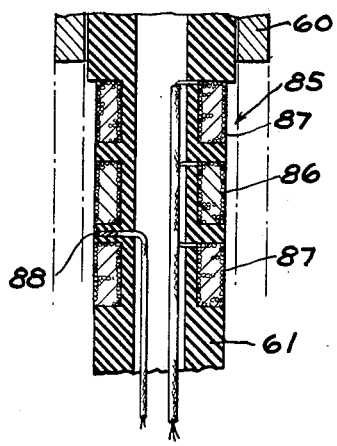
Figure 9:
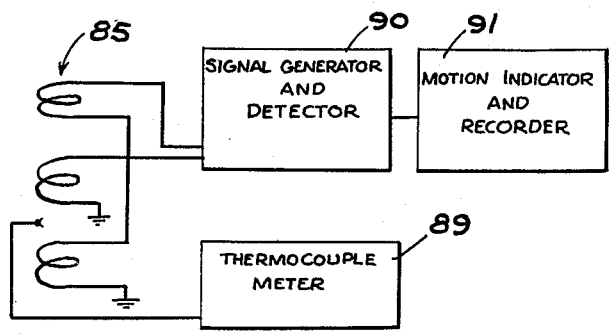

In the drawings:
FIG. 1 is a vertical section through a part of a glass forming machine embodying the invention and showing parts diagrammatically.
FIG. 2 is a fragmentary section of a portion of the apparatus shown in FIG. 1, the parts being shown in different relative positions.
FIG. 3 is a diagrammatic wiring diagram of the circuit used in connection with the apparatus shown in FIGS. 1 and 2.
FIG. 3a is a curve of the output of the circuit of FIG. 3.
FIG. 4 is a fragmentary vertical section similar to FIG. 2 of a modified form of the invention.
FIG. 5 is a block diagram of the circuit used in connection with the apparatus shown in FIG. 4.
FIG. 6 is a wiring diagram of a portion of the circuit shown in FIG. 5.
FIG. 7 is a diagrammatic representation of a non-inductively wound coil.
FIG. 8 is a fragmentary vertical section similar to FIG. 4 of a further modified form of the invention.
FIG. 9 is a diagram of a wiring circuit used in connection with the form of the invention shown in FIG. 8.

Referring to FIGS. 1 and 2, the invention is herein shown as used in association with a glass forming apparatus such as that as is more fully described in the patent to Rowe 2,508,890, issued May 23, 1950, titled Apparatus for Forming Glassware. Such a machine includes a socket member 10 fixed on a base (not shown). A vertically disposed pneumatic cylinder 11 has a lower head portion 12 provided with a depending tubular axial extension 13 which depends into the vertical bore of the socket member 10. The tubular member 13 is provided with external screw threads for engagement as at 14 with the threaded wall of a central opening in an annular cover member 15 which closes the upper part of the socket member 10 around tubular extension 13 and is retained in place in the socket member by a pin 16. The arrangement is such as to support the pneumatic cylinder 11 in vertical position at a height above the base which can be adjusted vertically within limits. The vertical adjustment of the cylinder 11 is effected by rotating an inclined rotary adjusting rod 17 which has teeth 18 on the lower end that mesh with an integral bevel gear portion 19 of the annular cover member 15. The inclined rod 17 has a reduced lower end portion 20 journalled in a bearing portion 21 of the socket member 10 and extends through the frame structure 22, shown in dot and dash lines, of the glassware forming machine. The extreme upper end portion of the rod 17 is non-circular, as indicated at 23c, for engagement with a suitable tool (not shown) by which the rod 17 may be turned about its axis.

The pneumatic cylinder 11 is provided with a top head 24 which constitutes the bottom part of an upstanding cylindrical holder 25. Holder 25 is designed to accommodate various forms of pressing plunger guiding and positioning units. One such unit, as shown in FIG. 1, comprises a cylindrical plunger guide consisting of concentric outer and inner cylindrical members 26 and 27, respectively, the inner cylindrical member 27 closely fitting within the outer cylindrical member 26. The plunger guide is disposed within the cylindrical holder 25 in concentric relation with the latter by the close fit of an externally enlarged upper portion 28 of the cylindrical guide with a counterbored upper end portion 29 of the cylindrical holder 25.

A pressing plunger 30 having a tapering tip 31 has its body enlarged at spaced areas 32, 33 to provide bearing surfaces in close sliding contact with the internal wall of the cylindrical plunger guide member 27. Plunger 30 is bored out at its center from its butt end nearly to its tip, such bore being enlarged at the butt end and provided with screw threads for engagement with the reduced externally threaded upper end portion of a piston rod 35. Piston rod 35 is carried by a piston 36 which fits slidably within the pneumatic cylinder 11 and is reciprocable in the latter to move the plunger vertically to different positions as hereinafter will be more particularly described. Piston rod 35 passes through a bearing member 37 in the cylinder head 24.

The cylindrical plunger guide 27 is slotted vertically from the lower end thereof for part of its height, as indicated at 38, to provide clearance for radial ears 39 on a plunger lifting disc 40 which is disposed within the cylindrical holder 14 at the bottom of the latter. A spring pressed sleeve 41 integral with ears 39 surrounds the lower portion of the cylindrical plunger guide within the holder. A coil spring 42 surrounds the sleeve 41 between the flanged upper end of such sleeve and a stationary thrust ring 43 in the bottom part of the cylindrical holder 25. A spacer ring 44 of a predetermined height is disposed within the cylindrical guide between the butt end of the plunger 30 and disc 40.

The cylindrical plunger guide 26 is provided at its top with a suitably configured annular seat 45 which is angled in cross sectional configuration as shown. A complementarily configured portion 46 of a thimble 47 is adapted to fit this seat 45 accurately when a neck mold 48 which carries the thimble is brought to an operative position with respect to the plunger guide. Neck mold 48 is formed in half sections, carried and operated by suitable holders, not shown, such for example, as those of the Hartford-Empire I.S. forming machine, as disclosed in the Ingle Patent 1,911,119, granted May 23, 1933. The halves of the neck mold have internal horizontal grooves 49 into which a flange on the thimble 47 projects sufficiently to permit the required opening and closing movements of the halves of the neck mold 48 without release of the thimble 47 from such neck mold halves.

The neck mold is designed to cooperate with a body mold 50 which, like the neck mold, may be formed of cooperative halves supported by suitable holders and operated by suitable structural parts, not shown, such, for example, as those provided for the blank mold halves of the Hartford-Empire I.S. machine as disclosed in the aforesaid Ingle Patent 1,911,119. The body mold 50 is locked to the neck mold 48 by the engagement of its halves with the neck mold 48 when the body mold halves are closed about the closed neck mold and thus is aligned with the latter to provide in conjunction therewith a molding cavity 51 having the portion thereof that is located in the neck mold internally grooved to form a neck finish portion of the article that is to be made. The cavity within the body mold 50 is temporarily open at its top to permit downward passage of a charge of molten glass thereto, after which the molding cavity is closed at its top by a suitable bottom plate 53. Bottom plate 53 may be supported and moved operatively in suitably timed relations with the movements of the other parts of the parison forming unit by structure such as is disclosed in the Ingle Patent 1,911,119.

The bottom plate 53, the body mold 50 and the neck mold 48 will be secured together in alignment by their co-engaging portions, as is usual in the case of a glassware forming machine of the type disclosed in the Ingle patent.

According to the invention, the hollow piston rod is made of metal and the lower portion 60 of piston rod 35 extends downwardly over an air inlet tube 61 which is made of an electrically insulating material, such as Formica. Air is adapted to be introduced to the interior of the tube 61 through inlet 62 and passage 63. The air passes upwardly through the tube 61 and hollow rod 35 through the interior of the plunger to cool the plunger.

The air escapes from the plunger through openings 64 and passes outwardly through passages 65 to the exterior. The upper end of the tube 61 is enlarged as at 66 and sealing rings 67a of suitable material, such as synthetic rubber, are provided to seal the end 66 against the interior of the rod 60.

A coil 67 is wound around a portion of the tube 61 within hollow piston rod 35 (FIG. 2). The leads from the ends of the coil 67 pass downwardly through the center of the tube 61 and radially through insulating grommets 68, 69 to a circuit, as presently described.

By this arrangement, the relative position of the metallic rod 35 relative to the coil 67 is changed as the plunger 30 is moved up and down. FIG. 1 shows the relative positions when the plunger 30 is down and FIG. 2 shows the relative positions when the plunger 30 is up. As the metallic rod 35 moves upwardly and downwardly in connection with the movement of the plunger 30, the inductance to the coil 67 is varied. The variation in inductance is utilized to produce a variable signal S (FIG. 3a) that is proportional to the movement of the plunger so that the signal measures both the movement and penetration of the plunger and can be used for controlling the variables that determine gob size, such as heaters adjacent the gob forming mechanism or the timing of the shears which cut the gob from the supply of glass. As the depth of penetration increases, the magnitude or height of the signal S increases (FIG. 3a).

As shown in the diagram of FIG. 3, coil 67 is connected in a tuned circuit with a signal generator 71 that produces a signal of constant frequency and amplitude. As the plunger 35 moves relative to the coil 67, the inductance of the coil 67 is changed. A rectifier 72 is combined with a voltage divider 73 to produce a D.C. output which is a function of and proportional to the frequency of the circuit whose inductance is varied by the movement of the piston rod 35. The D.C. output, S in FIG. 3a, can be recorded in a suitable recorder 74 such as a microammeter or in a permanent recording mechanism. Alternatively, the signal can be used to control the variables that control gob size.

Instead of measuring the variation in inductance of the circuit, a frequency sensitive detector such as is well known in the art may be used to meausre directly the variation in frequency of the tuned circuit due to movement of the metallic rod 35 relative to the coil 67.

It can thus be seen that by the above arrangement, there is provided within the apparatus, a device for determining plunger movement and penetration without mechanical connections between the various parts and without materially changing the construction or interfering with the providing of cooling air to the plunger.

Where the sensing apparatus is utilized continuously, it is desirable to provide means for compensating for variations in the signal that is obtained due to variations in temperature of the coil in the vicinity of the glass forming apparatus.

As shown in FIG. 4, this is achieved by providing a non-inductively wound coil 75, of the same wire size and length as coil 67, adjacent the coil 67. As is well known in the art, a coil may be wound non-inductively by doubling the wire thereof as shown in FIG. 7. By this arrangement, the coil 75, being of the same length as the coil 67, is caused to change in resistance due to temperature an amount corresponding to that of coil 67. By connecting the coil 75 to a compensating bridge, a corrective or compensating signal may be provided. Thus, as shown in FIG. 5, the output of the detector 76 is provided to a compensating bridge 77 to which the compensating coil 75 is connected. Bridge 77 provides corrective signals to the motion indicator and recorder 78 (FIG. 5).

The compensating bridge 77 can be of the type shown in FIG. 6 wherein a variable D.C. voltage, derived from the detector 76, is applied to opposite corners of a bridge 79, one leg of which contains the compensating coil 75.

It should be pointed out that the compensating coil, by reason of its being non-inductively wound, functions strictly as a resistance. The input to the bridge 79 will vary due to both the position of the core within the sensing coil and the effect on the sensing coil due to temperature changes. However, the bridge 79 will be unbalanced due to the same temperature changes that affect the coil 75, so the output of the bridge will be a temperature compensated signal proportional to the movement of a plunger relative to the coil support.

In the form of the invention shown in FIG. 8, a differential transformer 85 is provided, rather than coil 67, and is of conventional construction including a primary 86 and secondaries 87. The primary 86 and secondaries 87 are placed in grooves on the inlet tube 61 so that movement of the metallic piston rod 35 relative thereto will change the output of the transformer and produce a variable signal, that is, proportional to the movement of the plunger so that the signal measures both the movement and penetration of the plunger.

In order to compensate for temperature variations, a thermocouple 88 is provided adjacent the coils. Referring to FIG. 9, the signal or voltage from thermocouple 88 is caused to register on a meter 89. This compensating signal, in turn, can be used to compensate the output of a signal generator and detector 90 which receives a variable signal from differential transformer 85 and is supplied to a motion indicator 91.

I claim:
1. An apparatus for analyzing the movement of a glass forming plunger which comprises a glass forming plunger, a piston motor comprising a cylinder, a piston, means operatively connecting said plunger to said piston for moving said plunger into and out of a mold, a hollow piston rod of metallic material fixed to said piston, a relatively fixed member of electrical insulating material projecting into said hollow piston rod, means on the upper end of said fixed member providing a seal with the interior wall of said rod, said member being hollow so that cooling air can be supplied through said member to the interior of said rod, a wire winding wound around said member, whereby the change in position of said plunger causes the metallic piston rod to change in position relative to the winding and thereby cause a variation in the electrical properties of said winding, and a circuit associated with said winding for sensing variations in the electrical properties of said winding.
2. The combination set forth in claim 1 wherein said wire winding comprises a coil, the inductance of which changes as the plunger moves.
3. The combination set forth in claim 1 wherein said wire winding comprises a differential transformer.

References Cited by the Examiner
UNITED STATES PATENTS

| | | | |
|---|---|---|---|
| 943,858 | 12/09 | Betz | 65—318 |
| 1,321,347 | 11/19 | Wild et al. | 323—70 X |
| 2,350,329 | 6/44 | Hornfeck | 323—70 X |
| 2,620,469 | 12/52 | Estes | 323—90 X |
| 2,695,475 | 11/54 | Ellis | 65—160 |
| 2,702,444 | 2/55 | Rowe | 65—355 X |
| 2,730,560 | 1/56 | Hage | 65—162 |

DONALL H. SYLVESTER, *Primary Examiner.*